April 14, 1964    R. F. HAYS, JR    3,128,967
AIRCRAFT CONTROL SYSTEM
Filed Oct. 24, 1962    2 Sheets-Sheet 1

Robert F. Hays, Jr.    INVENTOR.

April 14, 1964      R. F. HAYS, JR      3,128,967
AIRCRAFT CONTROL SYSTEM
Filed Oct. 24, 1962      2 Sheets-Sheet 2
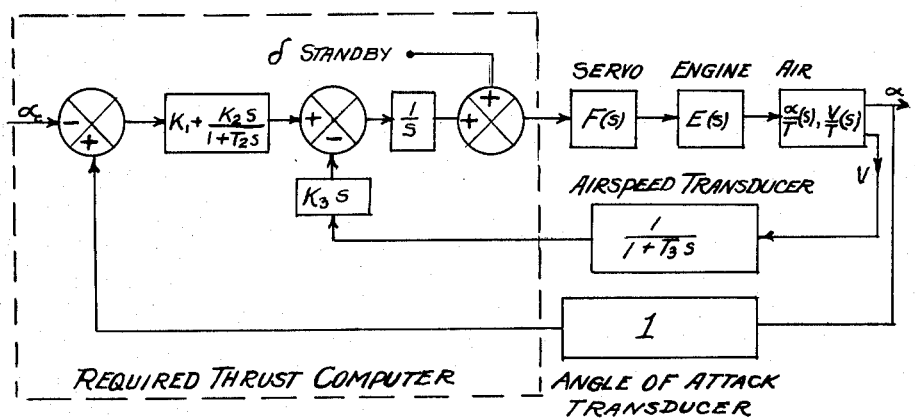
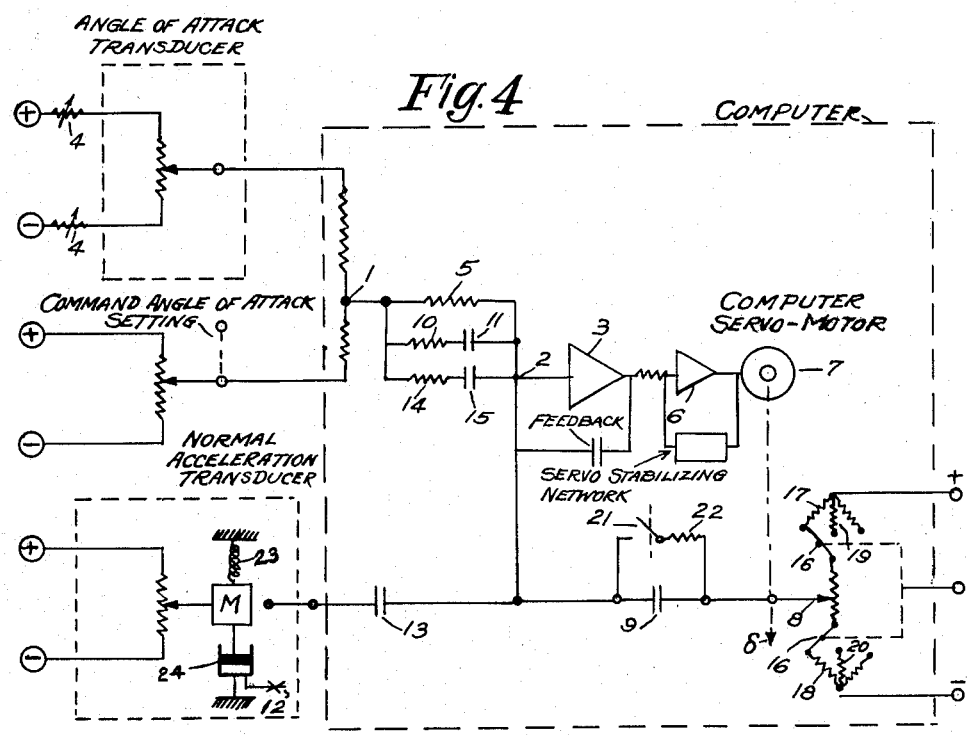
INVENTOR.
Robert F. Hays, Jr.

United States Patent Office 3,128,967
Patented Apr. 14, 1964

3,128,967
AIRCRAFT CONTROL SYSTEM
Robert F. Hays, Jr., Charlottesville, Va., assignor to Specialties Incorporated, Syosset, N.Y., a corporation of New York
Filed Oct. 24, 1962, Ser. No. 232,792
13 Claims. (Cl. 244—77)

This invention relates to aircraft control systems and is especially concerned with means for automatically controlling an aircraft to cause it to fly substantially at predetermined angle of attack.

In the operation of modern aircraft it is customary to specify the optimum coefficient of lift for many important modes of flight. In any fixed configuration of the aircraft, there corresponds to a given coefficient of lift a unique ratio of lift to drag forces, that is a unique value of aerodynamic efficiency. Maintaining the desired coefficient of lift is particularly important at slower speeds of operation and is of primary importance in landing approaches. Fortunately, under these conditions the coefficient of lift and therefore the aerodynamic efficiency depend only upon the angle of attack of the aircraft. Control of the proper angle of attack is most advantageously effected by means of engine power variation as this leaves the flight controls completely unburdened for their primary and essential purpose of controlling the flight path of the aircraft. Automatic control of the power to produce flight at the desired angle of attack is the principal object of my invention.

Automatic throttle control systems in the past have generally depended upon the departures of measured airspeed from a preset value to establish the required changes in throttle position. The most obvious disadvantage of such systems is that the proper value to be preset must be calculated from a knowledge of the aircraft's gross weight at the time. There is accordingly the possibility of error in calculation as well as in making the setting itself, often under conditions of stress, fatigue and distracting circumstances. There are additional less apparent disadvantages pertaining to these airspeed systems which will be described in detail, because it is a further object of my invention to avoid or overcome these several disadvantages by simple means.

It has been found that throttle control systems which are based upon measured airspeed errors relative to a preset value require additional input signals in order to be dynamically satisfactory. The more successful of these systems use the changes of pitch attitude to achieve good dynamic performance. However, these systems require yet additional input information in order to be safe in turns. In turns it is necessary to increase speed to avoid stall, buffet, or sometimes such large angles of attack as to place the aircraft in regions of reduced flight control and stability. Roll or bank angle is the additional signal used in the systems being described. When all these signals are properly selected as to relative magnitude and combined to generate throttle commands, the dynamic performance is known to be very satisfactory. However, the least obvious disadvantage of such systems remains; viz, the static accuracy may be insufficient. The obvious correction for this deficiency would be to integrate any residual airspeed error with an appropriate gain to generate commands for thrust changes which would wipe out the error in a short time. This stratagem is essentially precluded because it has been shown that when the integral is large enough in magnitude to be effective the dynamic performance deteriorates to an intolerable degree. In practice, the compromise has been one of either having no integral at all and accepting consequent static errors or using a small integral for gradual correction of steady state errors while accepting slight loss of dynamic performance. My automatic throttle control system surmounts these difficulties in the manner now to be described.

The system I have conceived and built controls the power so that in steady state the aircraft flies at the commanded angle of attack. As previously noted, this is most often the prescribed condition, for any gross weight of the aircraft, whether it is flying straight or turning. To achieve good dynamic performance, I introduce computer input signals proportional to changes in normal acceleration. These signals taken in conjunction with a proportion of the angle of attack error signals represent the current departures of airspeed from the value it would have in steady state at the command angle of attack and under steady acceleration corresponding to the bank angle being held. The relationship of the variables under discussion is most readily appreciated from the simple lift equation, $$\text{Lift} = nW = \tfrac{1}{2}\rho V^2 C_L A$$

where:

$W$ = gross weight of the aircraft
$n$ = normal acceleration in gravity units
$\rho$ = air density
$V$ = true airspeed
$C_L$ = coefficient of lift
$A$ = wing area Furthermore, we may write $$C_L = \frac{\partial C_L}{\partial \alpha}\alpha$$

and differentiate the above lift equation logarithmically, obtaining $$\frac{2dV}{V} = \frac{dn}{n} - \frac{d\alpha}{\alpha}$$

it being understood that W, A, $\rho$ and $$\frac{\partial C_L}{\partial \alpha}$$

are all constants. For differentials small compared to the reference values of V, $n$ and $\alpha$, this equation in V, $n$ and $\alpha$ is very precise. For larger differentials, it is sufficient that this expression represents the trend of the variable changes, for the relationship is used solely to elucidate how departures in $n$ and $\alpha$ from reference values provide information to the computer regarding transient variation of speed. The purpose of the $n$ signal is solely to provide good dynamic response of the overall system whenever the speed of aircraft is altered whether by the control itself in response to varying rates of turn, by wind gusts or by other disturbances. Theoretical analysis, analog simulation studies and extensive flight tests in high performance military jet aircraft have proven the validity of my combination of this normal acceleration input with angle of attack to obtain good dynamic system response.

It remains to explain exactly how my automatic throttle control system achieves high static accuracy without sacrificing dynamic performance. Whenever the inclination of the flight path with respect to horizontal is changed, the component of the aircraft's weight along the path changes; the propulsive thrust of the engines must be changed by this amount in the opposite sense to avoid acceleration or deceleration along the path. The required change of thrust evidently equals the weight of the aircraft multiplied by the incremental change of flight path inclination. It will now be shown that, under the conditions which exist during the operation of my automatic throttle control, this change of flight path inclination is closely approximated by the time integral of the difference between the measured angle of attack and its command value. The centripetal acceleration of the aircraft's center of mass which accompanies a rate of change of the flight path inclination is given by the formula $$\frac{V}{g}\dot{\gamma} = n - \cos \gamma$$

where V and n have the significance previously given, g is the acceleration of gravity, $\gamma$ the angle between the flight path and horizontal and $\dot{\gamma}$ its time rate of change. Remembering that $\gamma$ is small in all cases of practical importance and its cosine very nearly unity, the equation in differential form is approximately $$\frac{V}{g}d\gamma = (n-1)dt$$

which, integrated for a small change from the equilibrium state where $\dot{\gamma}=0$ and $n=1$, leads to $$\frac{V}{g}\Delta\gamma = \int_0^{\Delta t} \Delta n\, dt$$

It has previously been shown that $$\frac{2\Delta V}{V} = \frac{\Delta n}{n} - \frac{\Delta \alpha}{\alpha}$$

Hence, if V is held approximately constant by the control system, the increment $\Delta\gamma$ is approximately given by the time integral of $\Delta\alpha$, for it is to first order approximation simply proportional to $\Delta n$ by virtue of the small variations of $n$ and $\alpha$ with respect to their equilibrium values. I accordingly provide in my automatic throttle control a term which changes the thrust command proportionately to the assumed average weight of the aircraft multiplied by the time integral of the angle of attack variations relative to the set value. It will be appreciated that this integral term is dynamically necessary to compensate for flight path inclination changes due to maneuvering; that it is at the same time a relatively large term and that therefore it serves the purpose of quickly correcting any error in angle of attack which might otherwise tend to persist. In short, I have shown that the use of angle of attack error relative to the commanded value intrinsically requires a strong integral of this error for dynamic response and that consequently my control has the desired static accuracy.

Having explained the main objects of my invention, I will now proceed to specify in greater detail the means by which these objects are obtained in the actual embodiment of my invention.

In the drawings:

FIGURE 3 is a block diagram representing a modification of my invention.

FIGURE 4 is a schematic circuit diagram indicating connections of components of my invention.

Figure 1:
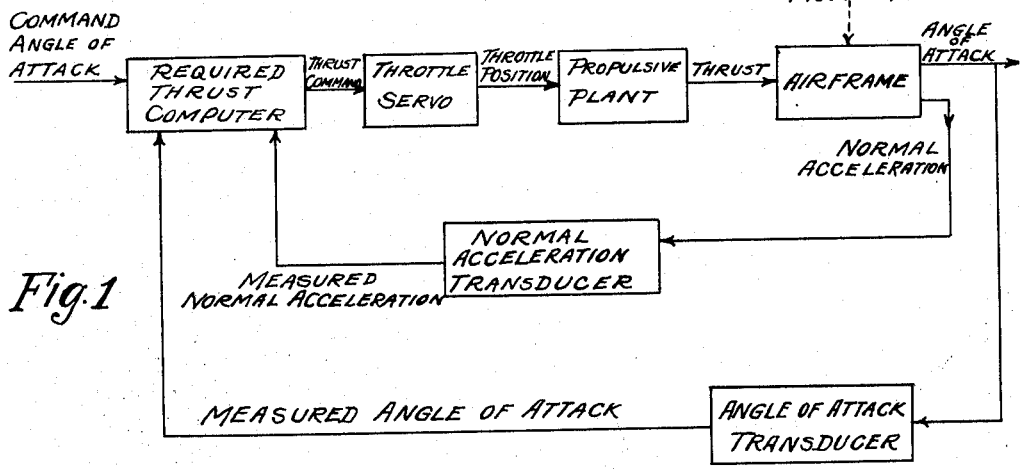
FIGURE 1 illustrates in functional block diagram form the combination of my automatic aircraft control system with the aircraft being controlled.

FIGURE 1 shows in functional block diagram form the combination of my automatic throttle control with the aircraft being controlled in such a manner as to maintain the desired coefficient of lift. The diagram shows that the command angle of attack, the measured angle of attack and the measured normal acceleration are the inputs to the thrust computer, the output of the latter being the required thrust command to the servo which positions the throttle control or controls of the aircraft's propulsive plant. The thrust of this plant is, of course, the controlled force acting upon the airframe.

Figure 2:
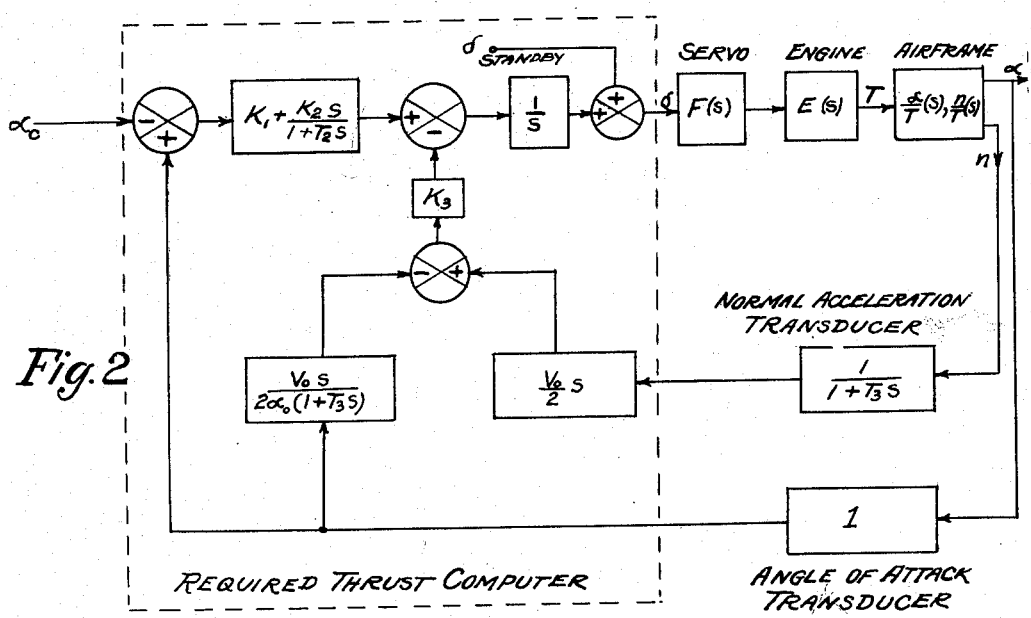
FIGURE 2 shows a possible form of conventional operational block diagram representing my automatic aircraft control system.

In FIGURE 2 one possible form of conventional operational block diagram representing my automatic throttle control system is shown for the purpose of facilitating discussion of the several elements of the system. I do not wish this diagram to be construed as in any sense limiting the scope of my invention, and I shall subsequently point out specific variations of the system represented in FIGURE 2 which are clearly within the compass of my invention. The explicit form chosen for the diagram in FIGURE 2 is both convenient and has the merit also of showing the most salient details of the system which has been actually and successfully reduced to practice. Throughout the diagram, the symbols stand for the complex Laplace transform variable as it is used in contemporary standard control system analysis. In this sense, transfer functions are displayed in individual blocks to represent the operational effect of the block on the input to produce its output.

I have indicated in generalized functional symbolism that the servo and engine have transfer functions F(s) and E(s), respectively. This is because the dynamic characteristics of these elements vary somewhat from one application to another. In FIGURE 2, E and S should be assumed to have the value of unity in steady state, i.e., as $S \to 0$. Usually F(s) represents a wholly negligible first or second order lag and E(s) is typically a first order delay having a one second time constant. It should be appreciated that should F(s) or E(s) assume a form in a particular application which would affect adversely the dynamic performance of my control, it would be feasible for me to introduce appropriate compensating or equalization functions in my computer to offset the dynamics of these elements. The transfer functions shown in the airframe block are, of course, only those transfers which are pertinent to the airframe response to the thrust inputs being controlled.

Examination of the diagram in FIGURE 2 reveals the operations performed on the two inputs by the computer. From block diagram algebra, one derives the equation for the required thrust command output of the computer.

$$\delta = \frac{K_1}{s}\Delta\alpha = \frac{K_2 \Delta\alpha}{1+T_2 s} - \frac{K_3 V_0}{2(1+T_3 s)}\left(\Delta n - \frac{\Delta \alpha}{\alpha_0}\right)$$

In this equation:

$$\Delta\alpha \equiv \alpha - \alpha_c$$

where $\alpha_c$ = command angle of attack $$\Delta n \equiv n - 1$$

$V_0$ and $\alpha_0$ are average constant reference values consistent for a given airplane with equations previously discussed.

$T_2$ and $T_3$ are time constants, usually between one half and one second, exactly chosen in a given airplane application to provide the desired amount of smoothing, respectively, for the second and third terms of the above equation. No smoothing is needed for the first, or integral, term.

$K_1$, $K_2$ and $K_3$ are the gains selected for the respective terms in the expression for $\delta$.

The significance of each of the three terms which are summed together to produce $\delta$ will now be discussed fully, individually.

The first term is just the integral of angle of attack error. As already shown, it provides the thrust change required for a change of flight path inclination if the aircraft is flying at the average reference speed $V_0$. For equilibrium speeds other than $V_0$, there is an error which will be rapidly removed by the continued output of the integration until $\alpha$ equals $\alpha_c$. If the engine thrust does not change the normally rated amount, due to engine wear, temperature or other cause, this strong integral contribution to $\delta$ will always insure that no difference can persist for long between $\alpha$ and $\alpha_c$.

The second term has not been previously touched upon. Its role is to provide thrust changes equal to aerodynamic drag changes which accompany the transient errors in angle of attack. The drag formula for the airplane may be written $$\text{Drag} = \tfrac{1}{2}\rho V^2 C_D A$$

where all the symbols have been previously defined in the lift equation except $C_D$, the coefficient of drag, which, as has been remarked, is a function at moderate speeds only of angle of attack. Actually, $C_D$ is a nonlinear function of $\alpha$, being very nearly equal to a constant plus a term proportional to the square of $\alpha$. I have found in practice that it is not generally necessary to represent this nonlinearity by varying coefficient $K_2$, although I have made and have had tested a version of my automatic throttle control system in which the nonlinear variation of $C_D$ with $\alpha$ was very accurately reproduced by a function generator in the computer which effectively varied $K_2$ proportionately to $$\frac{\partial C_D}{\partial \alpha}$$

the slope of the drag curve. Since in all cases the total value of $\alpha$ is available in the computer, it would be possible to vary $K_2$ (or any of the other gains as well) as a function of $\alpha$ in cases where a particular application indicates that such variation would noticeably improve the effectiveness of my control system. Before terminating the discussion of the drag term, it is important to call attention to a special safety feature of my control system which I am able to introduce through a simple expedient, usually associated with this term. Although it has been found in practice that my control system functions satisfactorily with the gains $K_1$, $K_2$ and $K_3$ simply constants for a given aircraft in a particular mode of flight at a selected coefficient of lift, it is important nevertheless to introduce some means of causing large, immediate thrust increases to take place whenever the angle of attack exceeds the command value by an amount large enough to either greatly increase the drag coefficient or to approach the condition of wing stall or excessive buffet. I accomplish this in my system most simply by providing for a discontinuous increase in effective gain $K_2$ whenever such hazardous conditions are imminent.

The last term in the expression given above for $\delta$ represents the thrust change command generated in the computer whenever the airspeed undergoes a variation from a steady state value, whether this steady state value pertains to straight line flight or flight with a constant turning rate. This has already been discussed mathematically, however, the equation I have given for $\delta$ does not make the truth of the statement just made above entirely evident. This is because in the block algebra used to derive the formula for $\delta$ from the diagram shown in FIGURE 2 the successive processes of differentiation and integration involved cancel in this algebra. Referring to the block diagram itself, it is obvious that in any steady state condition, the differentiation in the blocks preceding addition and multiplication by $K_3$ make the signal in this path zero, which proves the statement in question.

While FIGURE 2 illustrates the preferred version of my invention, I have prepared FIGURE 3 to illustrate a variation of my invention which would differ only by the substitution of an airspeed measurement with a suitable airspeed transducer for the combined $\alpha$ and $n$ signals which provided the third term having the gain $K_3$ in the equation for $\delta$. Theoretically, the systems shown in FIGURES 2 and 3 are exactly equivalent. The output of the airspeed transducer is first differentiated and then integrated so that only departures from any given steady state contribute to changes in the computer output. In either form of the system, this third term is introduced solely for its dynamic effect. Stability analysis, analog simulation and actual flight test have shown that the overall system damping, following any disturbance in airspeed, can be increased as desired by simply increasing $K_3$. Finally, it is demonstrable, and has been proven in flight tests, that my automatic throttle control system is stable, safe, and may be used successfully even for aircraft carrier approach and landing for the case of $K_3$ equal to zero, that is to say without the use of a normal accelerometer or, alternatively, an airspeed transducer. The versions of my control which include either type of the $K_3$ term for damping are, however, considered to be superior from a dynamic standpoint and are preferred to systems in which the term is absent.

In FIGURE 4 I show in a simplified electro-mechanical schematic diagram one method by which the angle of attack and normal acceleration transducer signals together with the command signal for the desired angle of attack may be fed into one version of my automatic throttle control computer which generates the required thrust output command $\delta$. This diagram represents identically the functional features of these components as already illustrated in the operational block diagram of FIGURE 2. In FIGURE 4, however, the schematic representation corresponds to the form of these elements actually used in one of my automatic throttle control systems which I have constructed and had successfully evaluated by flight tests in a carrier-based, turbojet, fighter type aircraft. In the diagram it should be understood that the terminals marked plus and minus are connected respectively to the two sides of my regulated D.C. voltage supply in the computer.

Starting with the angle of attack transducer, which in actual practice has been a Specialties, Inc., Airstream Direction Detector, Type RL50, this transducer consists of a cylindrical probe protruding from the side of the fuselage structure of the aircraft at a station ahead of the wing. The probe has slots which connect pneumatically to air chambers on either side of a paddle which is a part of the probe structure. When there is any difference in the pressure at the slots this difference appears across the paddle in a sense which causes the probe to rotate until the slots are symmetrically positioned with respect to the direction of airflow over the probe. The wiper of the potentiometer in the transducer is positioned by the probe and the voltage at the wiper contact is the signal for measured angle of attack. This signal is compared at the junction marked 1 in the diagram with a similar signal from the preset command angle of attack potentiometer and the voltage at junction 1 is accordingly an analog of $\Delta\alpha$. The junction marked 2 in the diagram represents the input to the high gain D.C. operational amplifier 3 and therefore remains at a fixed value, which we shall take as zero voltage, because of negative feedback to this point from the amplifier. If the rheostats 4 have been properly adjusted, the voltage at junction 1 will be zero also whenever $\Delta\alpha$ is zero. When $\Delta\alpha$ is not zero current will flow through the resistor 5 and a voltage will appear at the output of the operational amplifier 3 which will cause the servo amplifier 6 to apply voltage to the servo motor 7, causing it to rotate in a direction corresponding to the algebraic sense of $\Delta\alpha$. The servo motor positions the wiper 8 of the follow-up potentiometer. When the wiper moves its voltage changes, causing a current to pass through the capacitor 9 back to the point 2, with the net effect that the voltage change at wiper 8 is proportional to the time integral of the current which flows through resistor 5. Thus the servo motor output shaft position change $\Delta\delta$ is proportional to the time integral of $\Delta\alpha$ and the factor of proportionality can be adjusted by the product of the resistance value of 5 and the capacitance value of 9. This accounts for the first term, viz $$\frac{K_1}{s}$$

which was discussed earlier in the complete formula for $\delta$ which was derived from the block diagram of FIGURE 2.

Next I shall show that the second term in the complete formula for $\delta$ results from the current which flows from junction 1 to junction 2 by way of resistor 10 and capacitor 11. Remembering that junction 2 is at zero voltage, it is apparent that the current through capacitor 11 will be proportional to the rate of change of the voltage at junction 1. Moreover, this current will cause the wiper of the follow-up potentiometer to move an amount proportional to the time integral of that current which therefore is an amount of displacement proportional to Δα itself. However, the current through resistor 10 and capacitor 11 is delayed by a time constant equal to the product of the resistance of 10 and the capacitance of 11. This is the time constant $T_2$ shown in FIGURE 2. Also it is obvious that the current fed back through capacitor 9 to equalize the current fed in through capacitor 11 will be proportional to the capacitance of 9 while the current fed through capacitor 11 will be proportional to its capacitance and therefore the displacement of the servo shaft for the current which flowed through capacitor 11 will depend upon the ratio of the capacitances of units 9 and 11. Thus the magnitude of $K_2$ in FIGURE 2 may be adjusted in value by the choice of the capacitor 11.

In order to explain the development of the third term in the complete formula for δ, I will describe first the action of the normal acceleration transducer in producing one component of this term. FIGURE 4 shows an accelerometer consisting of a mass M, a spring 23, and a dashpot 24. The spring is connected at one end to the case of the accelerometer and at the other end to the mass. The mass is constrained to move rectilinearly; it carries the wiper of a potentiometer and is rigidly fastened to the piston of a dashpot. The gas enclosed in the cylinder of the dashpot communicates with the volume of the case through a pneumatic restriction 12. The mass, spring rate and dashpot damping are so chosen that the mass moves relatively to the case an amount proportional to the acceleration applied to the case, the displacement being delayed by a dominant time constant $T_3$, as shown in the operational block diagram of FIGURE 2. The accelerometer which I have used for this signal has been made by Specialties, Inc. Although such an accelerometer has two characteristic time constants, the relative damping is made many times the critical value of unity and therefore the dominant time constant is many times greater than the short time constant and the presence of the latter is thereby completely negligible.

It will now be obvious that a change in the position of the potentiometer wiper attached to the mass M will cause a current proportional to the rate of this change to flow through the capacitor 13 to the junction 2, delayed by the time constant $T_3$. Also to junction 2 a current proportional to rate of change of Δα will flow through capacitor 15, delayed by the time constant, which we make equal to $T_3$, given by the product of the resistance of element 14 and the capacitance of element 15. The magnitudes of these currents and the consequent displacements caused by them at the follow-up potentiometer will, in the manner already explained, be proportional to the respective ratios of the capacitance values of elements 13 and 15 to that of capacitor 9. Thus the last term of my formula for δ is achieved by the differentiation of the α and n signals, the establishment of their relative gains, their combination and their integration, these being the several processes operationally displayed in FIGURE 2.

I have also illustrated in FIGURE 4 the means by which the value of δ may be set to any desired value for the condition when all the input signals (i.e. currents to junction 2) are simultaneously zero. This will also elucidate the significance of the δ Standby symbols appearing in FIGURES 2 and 3. The points 16 in FIGURE 4 represent the mechanical connections of a manual or relay switch to the movable electrical contacts of the switches which connect resistors 17 and 18, 19 and 20, etc. between the ends of the follow-up potentiometer and the plus and minus connections to the power supply. It is obvious that the values of these inserted resistors can be chosen to locate the null voltage at any desired point on the follow-up potentiometer. When the computer is placed in the standby condition, switch 21 is closed and the servo will position the follow-up wiper approximately at the null voltage point of the follow-up potentiometer. If the resistance value of resistor 22 is very small compared with resistor 5, the wiper will stay very close to the null point irrespective of any input signals. Finally it should be noted that the choices of the resistor pairs 17 and 18, 19 and 20, etc. may be used to adjust the overall gain of the computer as well as the position of the null voltage point.

In my discussion of FIGURE 4 I have let the position of the computer servo output shaft represent δ. It is evident, however, that the output of any kind of data transmission device such as a transmitter synchro, a potentiometer or the like could alternatively represent the quantity δ. The choice of the appropriate device will simply depend upon the servo means used in the particular application to actuate the throttle or throttles of the aircraft's power plant.

In the specification or claims I use the word "engine" to refer to any suitable form of propulsive device which may be a piston type or jet engine, or a rocket, plasma, ion, electrical, or any other means for propelling an aircraft of any type. Likewise, I employ the word "throttle" to designate any suitable means for controlling the thrust propelling an aircraft. Accordingly, the word "throttle" can mean the customary valve for controlling flow of air-fuel mixture to an engine, or it can represent a mechanical or electrical control of any kind for regulating or directing the thrust of a propulsive plant or device carried by an aircraft.

The expression "normal acceleration" is well understood in aircraft parlance and refers to acceleration or deceleration in either direction perpendicular to the roll and pitch axes of an aircraft. The expression "angle of attack" is of course well understood by those skilled in the art.

To sum up, I have conceived and brought to practical realization novel aircraft control systems which are responsive to angle of attack and also to the combination of angle of attack and normal acceleration determinations. Aircraft equipped with my system have been successfully landed on airports and on aircraft carriers without any manual control of power by the pilot. These flights have demonstrated the superior performance and control of my novel system as compared to prior more limited systems. The enthusiastic acceptance by experienced pilots of my automatic control system, which I call "Auto-Throttle," attests to its outstanding advantages in providing greater convenience and safety in flying aircraft.

I claim:

1. In an aircraft engine throttle control system, means for controlling the thrust produced by an engine of said aircraft, means for determining angle of attack of said aircraft, means for determining normal acceleration of said aircraft, and means operatively connecting said angle of attack and acceleration determining means with said thrust controlling means to cause a predetermined mode of flight of said aircraft.

2. The aircraft engine throttle control system as described in claim 1, said operatively connecting means including a computer.

3. In an aircraft engine throttle control system, throttle means for controlling the thrust produced by an engine of said aircraft, means for setting a reference angle of attack, means for determining actual angle of attack of said aircraft, means for determining variation of said actual angle of attack from said reference angle of attack, means for determining normal acceleartion of said aircraft, and means operatively connecting said angle of attack variation determining means and said normal acceleration determining means with said throttle means to cause flight of said aircraft at substantially constant angle of attack.

4. In an aircraft engine throttle control system, throttle means for varying the effective thrust produced by an engine of said aircraft, means for setting a reference representative of a desired angle of attack, means for determining actual angle of attack of said aircraft, means for determining the degree of variation of said actual angle of attack from said reference angle of attack, means for determining normal acceleration of said aircraft, and computer means operatively connecting said angle of attack variation determining means and said normal acceleration determining means with said throttle means to produce flight of said aircraft at substantially constant predetermined angle of attack.

5. In an aircraft engine throttle control system, throttle control means including electrical means for varying the effective thrust produced by an engine of said aircraft, means for setting a reference representative of a desired angle of attack, means for determining actual angle of attack of said aircraft, means including electrical means for producing electrical signals representative of variation of said actual angle of attack from said desired angle of attack, means including electrical means for producing electrical signals representative of normal acceleration of said aircraft, and computer means including electrical components operatively connecting the aforesaid electrical means to produce automatically controlled flight of said aircraft at substantially constant predetermined angle of attack.

6. In an aircraft engine throttle control system, throttle means for causing variation of thrust produced by an engine of said aircraft, servo means for operating said throttle means, angle of attack reference means and means for setting said reference to represent a desired angle of attack, means for determining actual angle of attack of said aircraft, means for determining the degree of variation of said actual angle of attack from said reference angle of attack, means for determining normal acceleration of said aircraft, computer means; and means connecting said computer means with said servo means, and with said means for determining the degree of variation of said actual angle of attack from said reference angle of attack, and with said means for determining normal acceleration of said aircraft, to cause said servo means to adjust said throttle means to produce substantially constant angle of attack of said aircraft along a flight path.

7. In an aircraft engine throttle control system, throttle means for causing variation of thrust produced by an engine of said aircraft, servo means for operating said throttle means, first angle of attack means settable as a reference for desired angle of attack, second angle of attack means for determining actual angle of attack of said aircraft, comparing means for determining the degree of variation of said actual angle of attack from said reference angle of attack, accelerometer means for determining normal acceleration of said aircraft, computer means; and means operatively connecting said servo means, said comparing means, and said accelerometer means with said computer means which generates an output representing the sum of responses proportional to small changes of angle of attack and normal acceleration, said output being applied to said servo means to control the throttle means to cause flight of said aircraft effectively at substantially predetermined angle of attack.

8. The aircraft engine throttle control system as described in claim 7, said computer means generating an output representing the sum of responses proportional to small changes of angle of attack and normal acceleration and the time integral of said small changes of angle of attack.

9. The aircraft engine throttle control system as described in claim 6, said computer means generating an output representing the sum of responses proportional to small changes of angle of attack and the time integral of small changes of air speed with respect to small intervals of time.

10. The aircraft engine throttle control system as described in claim 6, said computer means generating an output representing the sum of responses proportional to small changes of angle of attack and the time integral of small changes of angle of attack.

11. The aircraft engine throttle control system as described in claim 6, said computer means generating an output varying non-linearly with variations of angle of attack.

12. The aircraft engine throttle control system as described in claim 6, said computer means generating an output proportional to the time integral of small changes of angle of attack and of correct magnitude to produce lift substantially equal to the component of weight of the aircraft along the flight path when the aircraft flies at constant air speed at the predetermined reference angle of attack.

13. In an aircraft engine throttle control system, throttle means for controlling the thrust produced by an engine of said aircraft, means for determining angle of attack of said aircraft, means for determining airspeed of said aircraft, and means operatively connecting said angle of attack determining means and said airspeed determining means with said throttle means to cause said aircraft to follow a predetermined mode of flight.

References Cited in the file of this patent

UNITED STATES PATENTS 2,875,965     Anderson _____ Mar. 3, 1959